US012741756B2

(12) United States Patent
Rosner et al.

(10) Patent No.: US 12,741,756 B2
(45) Date of Patent: Sep. 22, 2026

(54) MODULAR SPACECRAFT BUS SYSTEM AND ASSOCIATED METHODS

(71) Applicant: True Anomaly, Inc., Centennial, CO (US)

(72) Inventors: Ariel Rosner, Denver, CO (US); Kyle Nicholas Zakrzewski, Broomfield, CO (US); Sean Deniz Ozdemir, Lakewood, CO (US)

(73) Assignee: True Anomaly, Inc., Centennial, CO (US)

( * ) Notice: Subject to any disclaimer, the term of this patent is extended or adjusted under 35 U.S.C. 154(b) by 0 days.

(21) Appl. No.: 18/216,571

(22) Filed: Jun. 29, 2023

(65) Prior Publication Data

US 2024/0262535 A1 Aug. 8, 2024

Related U.S. Application Data

(60) Provisional application No. 63/439,022, filed on Jan. 13, 2023.

(51) Int. Cl.
*B64G 1/22* (2006.01)
*B64G 1/40* (2006.01)

(52) U.S. Cl.
CPC ........... *B64G 1/223* (2023.08); *B64G 1/4022* (2023.08)

(58) Field of Classification Search
CPC .............................. B64G 1/223; B64G 1/4022
See application file for complete search history.

(56) References Cited

U.S. PATENT DOCUMENTS 4,880,187 A * 11/1989 Rourke ................ B64G 1/1078 244/171.1
5,755,406 A * 5/1998 Aston .................. B64G 1/1007 244/159.4

(Continued)

FOREIGN PATENT DOCUMENTS

AU 202318639 12/2023
CN 113277121 A 8/2021

(Continued)

OTHER PUBLICATIONS

National Aeronautics and Space Administration, "Ames Modular Common Spacecraft Bus," NASA Facts, FS-2015-07-02-ARC, published 2015 in US.

(Continued)

*Primary Examiner* — Michael H Wang
(74) *Attorney, Agent, or Firm* — Fenwick & West LLP

(57) ABSTRACT

A spacecraft bus system described herein includes a propulsion assembly, a top plate assembly, and a bottom plate assembly. Each one of the propulsion assembly, the top plate assembly, and the bottom plate assembly is configured to be separately assembled and tested for spaceworthiness. Also described herein is a propulsion assembly for use with a spacecraft. The propulsion assembly includes a propellant tank containing propellant therein, at least one thruster, and a frame configured for supporting the propellant tank and the at least one thruster thereon. The propulsion assembly, as an individual module, is configured to be assembled and subjected to testing related to spaceworthiness. Additionally, the frame may be further configured for attachment to other components of the spacecraft, after being assembled and subjected to testing, without modification to the propulsion assembly or the other components of the spacecraft.

8 Claims, 6 Drawing Sheets

(56) References Cited

U.S. PATENT DOCUMENTS

| | | | | |
|---|---|---|---|---|
| 5,779,195 A * | 7/1998 | Basuthakur | B64G 1/22 244/173.1 |
| 5,839,696 A * | 11/1998 | Caplin | H05K 7/20254 244/159.4 |
| 5,979,833 A | 11/1999 | Eller et al. | |
| 6,131,857 A * | 10/2000 | Hebert | B64G 1/10 244/159.4 |
| 6,149,104 A * | 11/2000 | Soranno | B64G 1/1078 244/159.4 |
| 6,206,327 B1 | 3/2001 | Benedetti et al. | |
| 6,293,499 B1 * | 9/2001 | MacGillivray | B64G 1/10 244/159.5 |
| 10,059,468 B1 * | 8/2018 | Judd | B64G 1/54 |
| 2017/0361948 A1 | 12/2017 | Lumaca et al. | |

FOREIGN PATENT DOCUMENTS

| | | |
|---|---|---|
| CN | 114476125 A | 5/2022 |
| EP | 1101699 A2 | 5/2001 |
| NZ | 433120 | 12/2023 |
| WO | WIPO141920 | 12/2023 |
| WO | PCTUS2024010788 | 1/2024 |
| WO | WO2024182056 A2 | 9/2024 |

OTHER PUBLICATIONS

WIPO, "International Search Report and Written Opinion," for PCT/US2024/010788, Oct. 23, 2024, published in US.

Japan Patent Office, "Notification of Refusal", dated Apr. 12, 2024, published in JP.

IP Australia, "Formalities notice No. 1—requirements for registration not met," dated Feb. 7, 2024, published in AU.

IP Australia, "Formalities notice No. 2—requirements for registration not met," dated Mar. 19, 2024, published in AU.

* cited by examiner

MODULAR SPACECRAFT BUS SYSTEM AND ASSOCIATED METHODS

REFERENCE TO RELATED APPLICATIONS

The present application claims the benefit of U.S. Pat. App. No. 63/439,022, filed 2023 Jan. 13 and titled "Modular Spacecraft Bus System and Associated Methods," which is incorporated hereby in its entirety by reference.

FIELD OF THE INVENTION

The present invention relates to spacecraft. In particular, but not by way of limitation, the present invention relates to modular spacecraft with improved manufacturability.

DESCRIPTION OF RELATED ART

Current methods of building a spacecraft generally involve the selection and production of a propulsion system, then essentially designing and building the rest of the spacecraft around the propulsion system. The capacity and system requirements of the spacecraft are highly dependent on the performance specifications of the propulsion system, and thus the build-out of the spacecraft is customized for the particular combination of the selected propulsion system and other components to be integrated into the spacecraft.

For example, for a propellant-based propulsion system, a containment system and ignition system for the selected propulsion system is first produced and placed in an enclosure, then the remainder of the spacecraft, such as guidance and control systems, solar panels, and other payloads are secured inside or around the enclosure. Such an approach requires the propulsion system to be completed first, although the propulsion system is often the spacecraft component with the longest lead time. In other words, as spacecraft are typically built with the payload integrated into the bus or enclosure, the specifics of the payload must be known early in the design process to ensure compatibility of the propulsion system, the bus or enclosure, and the payload. If there is a modification in the payload after the design is completed, typically at least the spacecraft bus must be redesigned and customized again.

Also, the assembly and testing of the remainder of the spacecraft, other than the propulsion system, cannot be completed until these remaining components are integrated with the propulsion system. In this way, the spacecraft assembly must be performed in series in a set order, rather than having various components being assembled and tested in parallel. Further, if there is an issue with the propulsion system after spacecraft assembly, or if the propulsion must be refueled, such processes are challenging to perform once the various components have been built around the propulsion system.

An exemplary spacecraft building process may involve, for instance, the following steps:

1) Build a propulsion system;
2) Test the propulsion system;
3) Build enclosure around the tested propulsion system or place the tested propulsion system into an existing enclosure structure;
4) Obtain client-provided payload, within specific payload guidelines to be compatible with the given propulsion system and enclosure structure;
5) Integrate the client-provided payload into or onto the enclosure structure;
6) Integrate the necessary auxiliary equipment (guidance and control, solar panels, antennae, booms, sensing equipment, thrusters, probes, generators, etc.) into or onto the enclosure structure;
7) Test the integrated structure (vibration test, thermal test, acoustic test, etc.); and
8) If the integrated structure has any issues with the testing, take the structure apart, address the issues, put the integrated structure back together, then test again.

Another issue with existing spacecraft systems is that they are typically formed of two or more materials, including exotic materials and/or composite structures. The use of various materials in a single spacecraft can add technical risk, complexity, and cost to a particular spacecraft design. Moreover, composite structures tend to be more difficult to manufacture, thus may be prone to including defects therein and are difficult to re-tool and modify on short notice.

Thus, there is a need for an improved spacecraft system with more flexibility to accommodate a variety of design changes and improved manufacturability.

SUMMARY OF THE INVENTION

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an embodiment, a spacecraft bus system includes a propulsion assembly, a top plate assembly, and a bottom plate assembly. Each one of the propulsion assembly, the top plate assembly, and the bottom plate assembly is configured to be separately assembled and independently tested for spaceworthiness.

In another embodiment, a propulsion assembly for use with a spacecraft includes a propellant tank containing propellant therein, at least one thruster, and a frame configured for supporting the propellant tank and the at least one thruster thereon. The propulsion assembly, as an individual module, is configured to be assembled and subjected to testing related to spaceworthiness. Additionally, the frame may be further configured for attachment to other components of the spacecraft, after being assembled and subjected to testing, without modification to the propulsion assembly or the other components of the spacecraft.

In an embodiment, a spacecraft bus system includes a propulsion assembly, a top plate assembly, and a bottom plate assembly. Each one of the propulsion assembly, the top plate assembly, and the bottom plate assembly is configured to be separately assembled and tested for spaceworthiness.

In embodiments, each one of the propulsion assembly, the top plate assembly, and the bottom plate assembly is formed of a single material. In certain embodiments, the single material is aluminum.

In embodiments, each one of the propulsion assembly, the top plate assembly, and the bottom plate assembly is further configured for supporting at least one component thereon including a propellent tank, a fuel tank, a thruster, a sensor, an imager, a camera, a robotic arm, a boom arm, navigation equipment, a solar panel, an antenna, a bracket, and an attachment bracket.

In certain embodiments, a propulsion assembly for use with a modular spacecraft system, the propulsion assembly includes a propellant tank containing propellant therein, at least one thruster, and a frame configured for supporting the propellant tank and the at least one thruster thereon. The propulsion assembly, as an individual module, is configured to be assembled and subjected to testing related to spaceworthiness.

In embodiments, the frame is further configured for attachment to other components of the modular spacecraft system, after being assembled and subjected to testing, without modification to the propulsion assembly or the other components of the modular spacecraft system. In certain embodiments, the other components include a top plate assembly and a bottom plate assembly.

In embodiments, a method for manufacturing a modular spacecraft system is disclosed. The method includes assembling a propulsion assembly, testing the propulsion assembly for spaceworthiness, assembling a top plate assembly, independently testing the top plate assembly for spaceworthiness, assembling a bottom plate assembly, and independently testing the bottom plate assembly for spaceworthiness. The method further includes integrating the propulsion assembly, the top plate assembly, and the bottom plate assembly to form the modular spacecraft system.

In certain embodiments, the method further includes testing the modular spacecraft system so formed for spaceworthiness. In embodiments, if an issue is found with one of the propulsion assembly, the top plate assembly, and the bottom plate assembly during the testing of the modular spacecraft system so formed, the method further includes identifying a particular one of the propulsion assembly, the top plate assembly, and the bottom plate assembly with the issue, and addressing the issue with the particular one of the propulsion assembly, the top plate assembly, and the bottom plate assembly, re-testing the particular one of the propulsion assembly, the top plate assembly, and the bottom plate assembly for spaceworthiness. The method further includes re-integrating the propulsion assembly, the top plate assembly, and the bottom plate assembly to re-form the modular spacecraft system, without re-testing of all of the propulsion assembly, the top plate assembly, and the bottom plate assembly other than the particular one of the propulsion assembly, the top plate assembly, and the bottom plate assembly to form the modular spacecraft system.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

Figure 1:
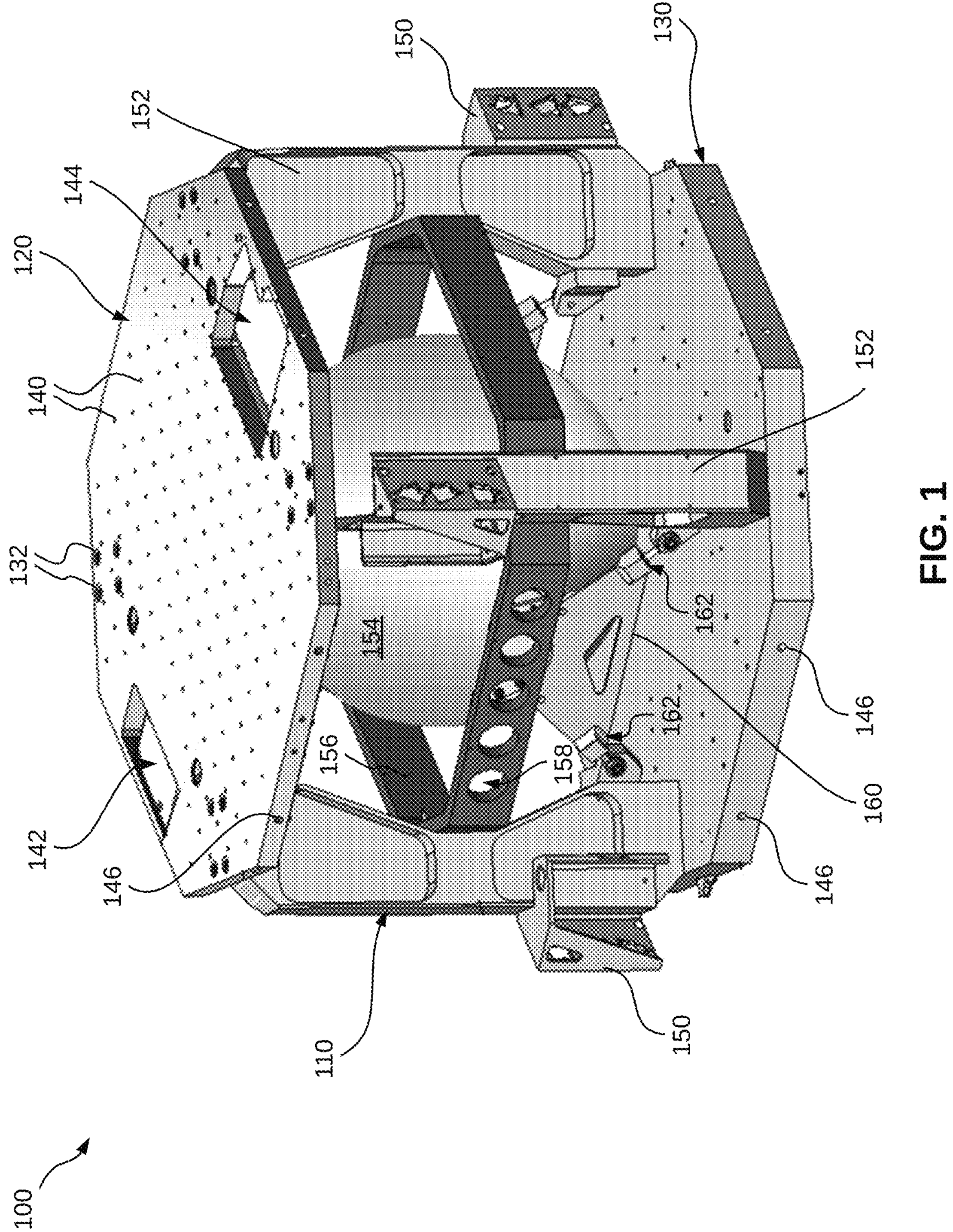
FIG. 1 illustrates a perspective view of a modular spacecraft system, in accordance with an embodiment.

For simplicity and clarity of illustration, the drawing figures illustrate the general manner of construction, and descriptions and details of well-known features and techniques may be omitted to avoid unnecessarily obscuring the embodiments detailed herein. Additionally, elements in the drawing figures are not necessarily drawn to scale. For example, the dimensions of some of the elements in the figures may be exaggerated relative to other elements to help improve understanding of the described embodiments. The same reference numerals in different figures denote the same elements.

The word "exemplary" is used herein to mean "serving as an example, instance, or illustration." Any embodiment described herein as "exemplary" is not necessarily to be construed as preferred or advantageous over other embodiments. In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents.

DETAILED DESCRIPTION OF THE INVENTION

To address the various issues with current spacecraft design and manufacturing methods discussed above, it would be desirable to enable the design and build of a spacecraft such that different assemblies that form the spacecraft may be built and independently tested in parallel, then assembled together prior to final testing.

The present disclosure describes a modular spacecraft designed for a more efficient manufacturing workflow than currently available. In particular, the design described herein separates the spacecraft layout into multiple major assemblies that may be separately built, independently tested for spaceworthiness, then integrated to form the final launch vehicle.

Whereas previous efforts, such as the Modular Common Spacecraft Bus (MCSB) developed by NASA, have aimed to enable modularity of design for a variety of payloads, such systems are large, expensive systems designed for specific propulsion systems and configured for accommodating payloads that are able to fit within the enclosure of a payload module, rather than being able to accommodate a variety of propulsion systems and payload configurations. While each one of the components and payloads included in the MCSB may be separately tested for spaceworthiness then assembled, many restrictions are placed on each component to fit within the confines of the MCSB framework. Further, once designed and assembled, the propulsion system, components, and payloads of a given MCSB assembly are difficult to service and/or replace, thus further complicating certification of spaceworthiness.

In an embodiment, the modular design includes an easily manufacturable spacecraft bus, including three major assemblies that may be separately manufactured and independently tested for spaceworthiness. In certain embodiments, one of these major assemblies incorporates the entire propulsion system as a single module/structure, which may be built, leak/pressure tested, then delivered as a complete module ready for integration with other components of the spacecraft.

FIG. 1 illustrates a perspective view of a modular spacecraft system, in accordance with an embodiment. As shown in FIG. 1, a system 100 includes a propulsion assembly 110, a top plate assembly 120, and a bottom plate assembly 130. Each one of propulsion assembly 110, top plate assembly 120, and bottom plate assembly 130 may be separately built then integrated to form system 100.

In the exemplary embodiment illustrated in FIG. 1, top plate assembly 120 may be bolted onto propulsion assembly 110 via bolts through bolt holes 132. Top plate assembly 120 may include a plurality of openings 140, such as a set of standardized bolt patterns (e.g., a grid of ¼-20 or M6 holes on 1 inch or 25 mm spacing, similar to that used on commercial optical tables) for hosted payloads. Top plate assembly 120 may also include one or more surfaces 142 and apertures 144 for attachment of additional components or payloads such as, but not limited to, sensors, imagers, cameras, robotic arms, boom arms, navigation equipment, solar panels, antennae, attachment brackets, and other components suitable for use with spacecraft systems as commonly used in the spacecraft art. Top plate assembly 120 may further include holes 146 along one or more edges for a variety of purposes, such as, but not limited to, attachment of additional components thereto and/or for ease of lifting and moving top plate assembly 120 and/or system 100 during assembly, transport, and testing.

Propulsion assembly 110 may include, for example, a plurality of brackets 150 mounted onto legs 152 for attachment of thrusters and other components thereto. Propulsion assembly 110 is configured to support, for instance, a propulsion system 154 by a frame 156, which in turn is attached to legs 152. Propulsion system 154 may include components such as, for example, a propellent or fuel storage tank, reactor chamber, control systems, connections to thrusters, and other components necessary to provide propulsive forces for maneuvering system 100 in space. Optionally, frame 156 may include a plurality of openings 158 for attachment of additional components or to serve as through-holes. Also optionally, propulsion system 154 may be attached to legs 152 using brackets 160 via attachments 162. In examples, attachments 162 may be adjustable in length to be able to accommodate a variety of configurations of propulsion systems and brackets. Legs 152 and frame 156 are formed of a sufficiently stiff material for supporting propulsion system 154 therein, while providing ready access to the propulsion system for spaceflight.

Propulsion assembly 110 may include, for example, a propellant tank, one or more thrusters, and a frame for supporting the propellant tank such that propulsion assembly 110 may be separately assembled and subjected to testing related to spaceworthiness as an individual module. The tested propulsion assembly may then be integrated with top and bottom plate assemblies, each assembly having been assembled and independently tested, separately from propulsion assembly 110, thus eliminating a major disadvantage of existing spacecraft bus systems requiring assembly of the full spacecraft prior to testing for spaceworthiness and/or requiring components and payloads to be attached around the propulsion assembly and confined to specific dimensions that fit within the confines of an outer shell.

Bottom plate assembly 130 may include a plurality of openings, similar to openings 140 and holes 146, surface 142, and aperture 144 on top plate assembly 120. As shown in FIG. 1, propulsion assembly 110, top plate assembly 120, and bottom plate assembly 130 may be assembled and tested separately, then simply bolted together to form system 100. In this way, modifications may be made to the various payloads and components attached to any one of the three assemblies without having to redesign the other two assemblies. Further, additional components such as robotic arms and solar panels, separately tested for spaceworthiness, may be bolted onto propulsion assembly 110, top plate assembly 120, and bottom plate assembly 130 after system 100 has been assembled together. For example, each one of propulsion assembly 110, top plate assembly 120, and bottom plate assembly 130 may include surfaces, apertures, bolt holes, and the like for attachment of additional components or payloads such as, but not limited to, propellent tanks, fuel tanks, thrusters, sensors, imagers, cameras, robotic arms, boom arms, navigation equipment, solar panels, antennae, attachment brackets, and other components suitable for use with spacecraft systems as commonly used in the spacecraft art.

Top plate assembly and bottom plate assembly accommodate a variety of component and payload configurations attached thereto without affecting the operation of the propulsion system. Conversely, the propulsion assembly may be modified without affecting the components and payloads attached to top plate assembly 120. In other words, unlike previously available spacecraft bus systems, modular spacecraft system 100 accommodates a much wider range of components and payloads to be attached thereto, while enabling heretofore unavailable manufacturability and serviceability.

For instance, the propulsion system supported in propulsion assembly 110 may be readily replaced, without having to disassemble any component supported on either the top or bottom plate assembly or having to redesign the entire structure. In certain embodiments, enclosure panels (not shown) may be attached to legs 152, frame 156, top plate assembly 120, and/or bottom plate assembly 130 to enclose the propulsion system therein.

It is noted that, while top and bottom plate assemblies as well as frame 156 are shown in FIG. 1 as having a generally octagonal shape. This shape may be particularly advantageous in providing a structural load path for strategically distributing the loads throughout the modular spacecraft system structure. Other shapes for the top and bottom plate assemblies and the frame are also contemplated and are considered to be a part of the present disclosure.

Figure 2:
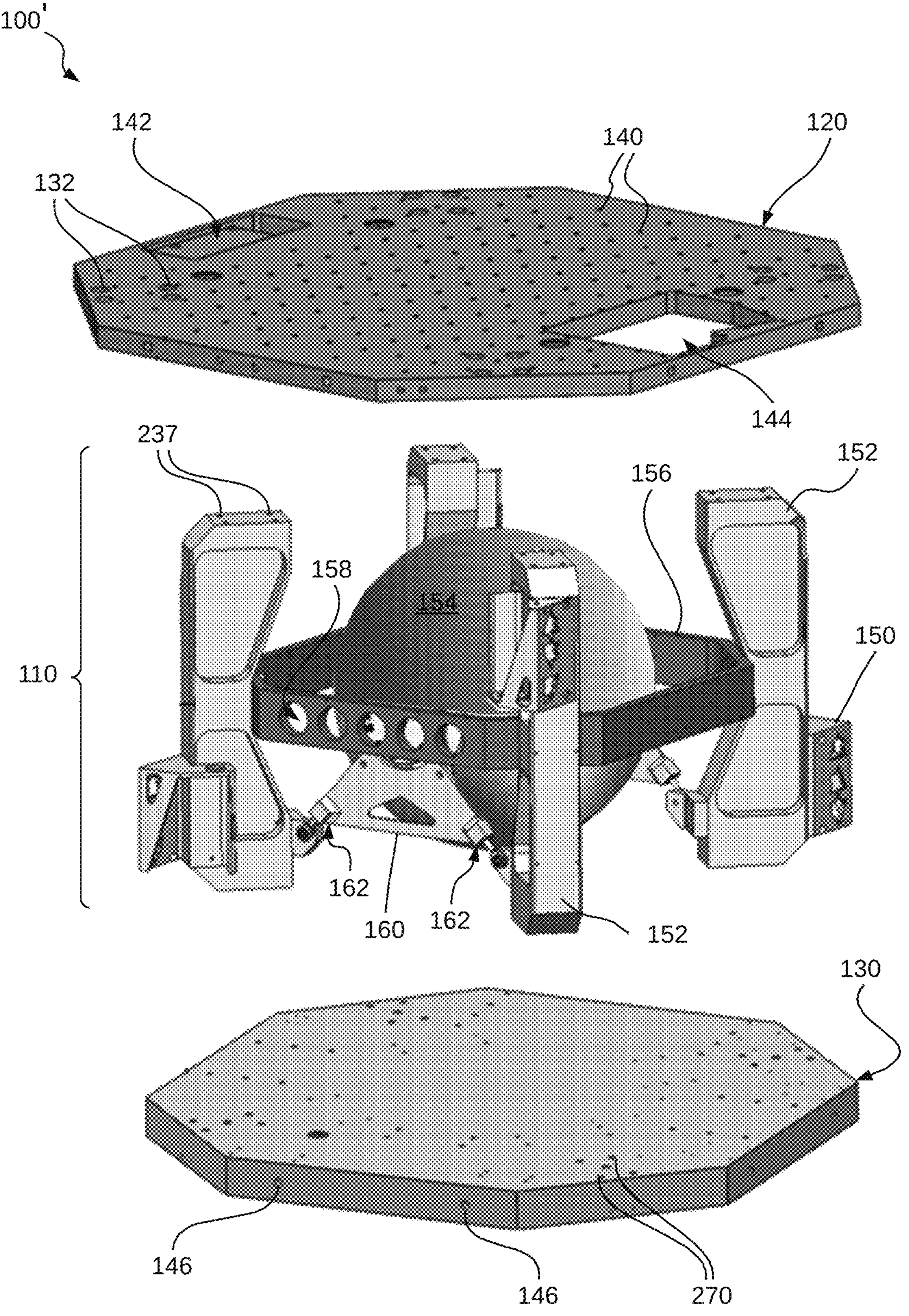
FIG. 2 illustrates an exploded view of the modular spacecraft system of FIG. 1, in accordance with an embodiment, shown here with the three main assemblies separated to highlight the modularity of the modular spacecraft system.

FIG. 2 illustrates an exploded view 100' of the modular spacecraft system of FIG. 1, in accordance with an embodiment, shown here with the three main assemblies separated to highlight the modularity of the modular spacecraft system. As visible in FIG. 2, top plate assembly 120 include a plurality of bolt holes 132 aligned with holes 237 on legs 152 of propulsion assembly 110 such that top plate assembly 120 may be affixed to propulsion assembly 110 using, for example, bolts. Similarly, bottom plate assembly 130 includes a plurality of holes 270, aligned with bolt holes (not visible) formed on the bottom side of legs 152, such that bottom plate assembly 130 may be bolted onto propulsion assembly 110. Additional features, such as snaps, locking mechanisms, and other features for assisting with the alignment and securing of top plate assembly 120 and bottom plate assembly to propulsion assembly 110 are also contemplated and are considered to be a part of the present disclosure.

In certain embodiments, system 100, including propulsion assembly 110, top plate assembly 120, bottom plate assembly 130, and the various components attached thereto may be formed of a single material, such as aluminum. The use of a single metal to form the entirety of system 100 may help ensure the system, when assembled of the various assemblies after each assembly has been independently tested, will exhibit uniform behavior during the testing of the completed system. Whereas composite structures and materials are often used in spacecraft development due to their favorable strength-to-weight ratios, composite structures cannot be used to integrate payloads into a spacecraft late in production, as they often require additional system-level testing by the launch providers. Further, composite structures generally cannot be reworked or modified because attachment points are bonded early in the structure fabrication process. Such an all-aluminum structure as described herein may significantly simplify structural/thermal analysis, manufacturing, assembly, and testing for each assembly and for the completed system, as aluminum is one of the cheapest and easiest materials to machine. In fact, whereas a composite structure may take 8-12 months to fabricate, an aluminum bus structure may be fabricated in a matter of weeks and can be rapidly reworked or adjusted if modifications are deemed necessary, without requiring a requalification of the entire structure.

It is noted that, conventionally, metallic structures are considered problematic for spacecraft due to large alignment shifts that may occur due to a higher coefficient of thermal expansion (CTE) for metals. Such alignment shifts are one consideration, in addition to weight-to-strength ratio, that many current spacecraft designs have utilized composite materials. However, the present system design, with colocation of the critical pointing payloads at the top and bottom plate assemblies with specific attachment points to integrate the propulsion, top plate, and bottom plate assemblies together, allows the all-metallic design without the thermal expansion concerns. Also, a variety of cutout configurations and bolt hole arrangements may be used to enhance the strength of the spacecraft bus system as described above. Other materials may be used to form the modular spacecraft bus of the present disclosure, as long as the material exhibits suitable structure and material characteristics and are considered a part of the present structure.

In this modular approach, each one of propulsion assembly 110, top plate assembly 120, and bottom assembly 130 may be separately assembled and tested, with a variety of components and/or payloads integrated therewith. That is, propulsion assembly 110 may be assembled and tested separately from top plate assembly 120 and bottom plate assembly 130, and vice versa. For instance, this modular design opens more possibilities for additional hosted payloads to be bolted onto the top plate assembly, and then integrated into the spacecraft very late in the production flow.

Figure 3:
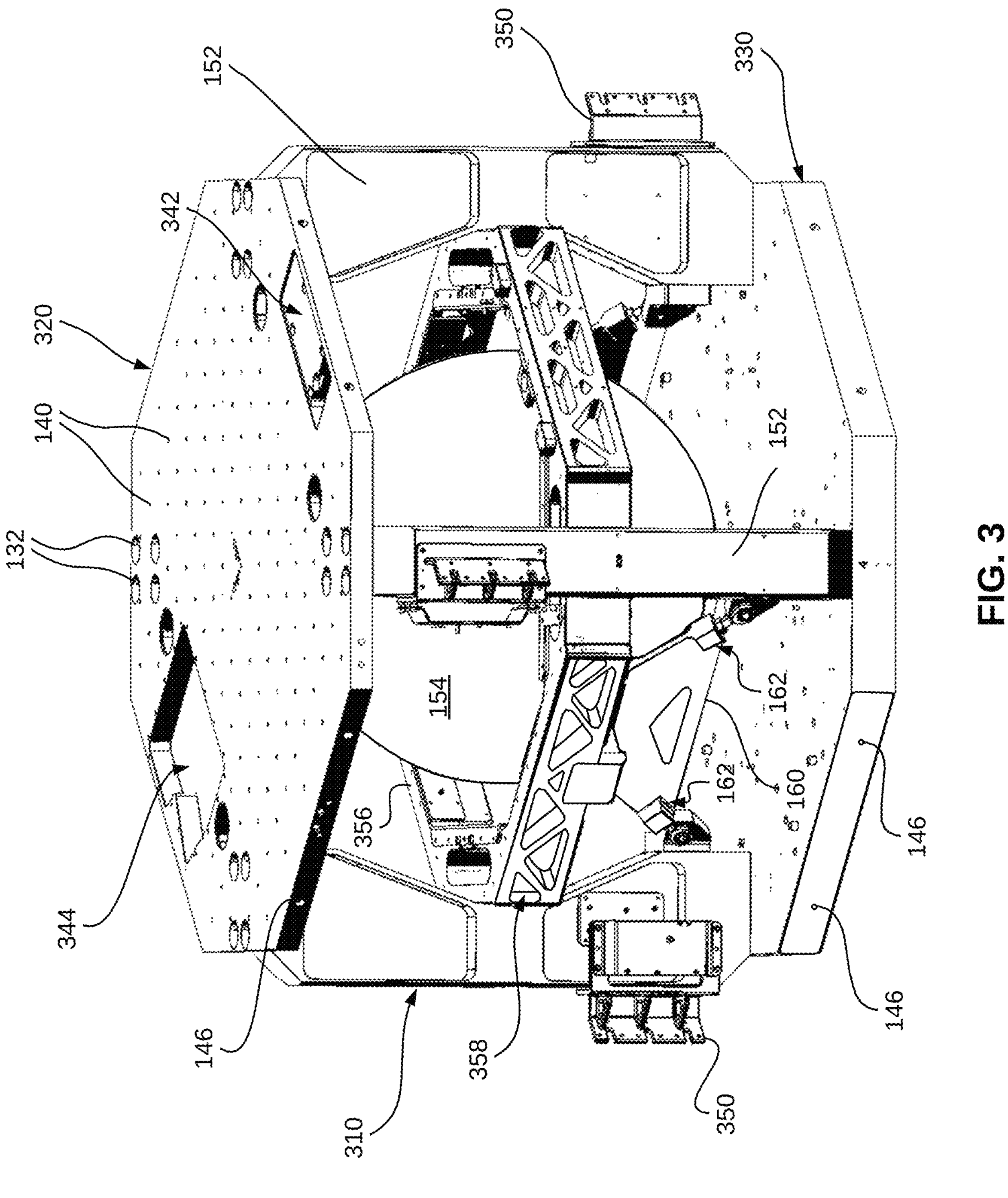
FIG. 3 illustrates a perspective view of an alternative embodiment of a modular spacecraft system.

FIG. 3 illustrates a perspective view of an alternative embodiment of a modular spacecraft system. While several of the components of a modular spacecraft system 300 are the same as those illustrated in FIGS. 1 and 3, certain aspects of propulsion assembly 310, top plate assembly 320, and bottom plate assembly 330 may be modified with respect to their equivalents in modular spacecraft system 100. For example, top plate assembly 310 may include slightly modified shapes of surfaces 342 or apertures 344 compared to surface 142 and aperture 144 of FIGS. 1 and 2, modular spacecraft system 300 includes modified brackets 350 attached to legs 152, and bottom plate assembly 330 may include different configurations of bolt holes and other features, thus illustrating the flexibility of modular spacecraft system 300 to accommodate a variety of attachments thereto. Further, propulsion assembly 310 includes a modified frame 356 including modified arrangement of openings 358. Openings 358 are configured to provide sufficient structural integrity to support propulsion system 154, while having a reduced weight compared to frame 156 of FIGS. 1 and 2. A variety of configurations of the frame thickness, width, and opening shapes are contemplated and are considered a part of the present disclosure.

Figure 4:
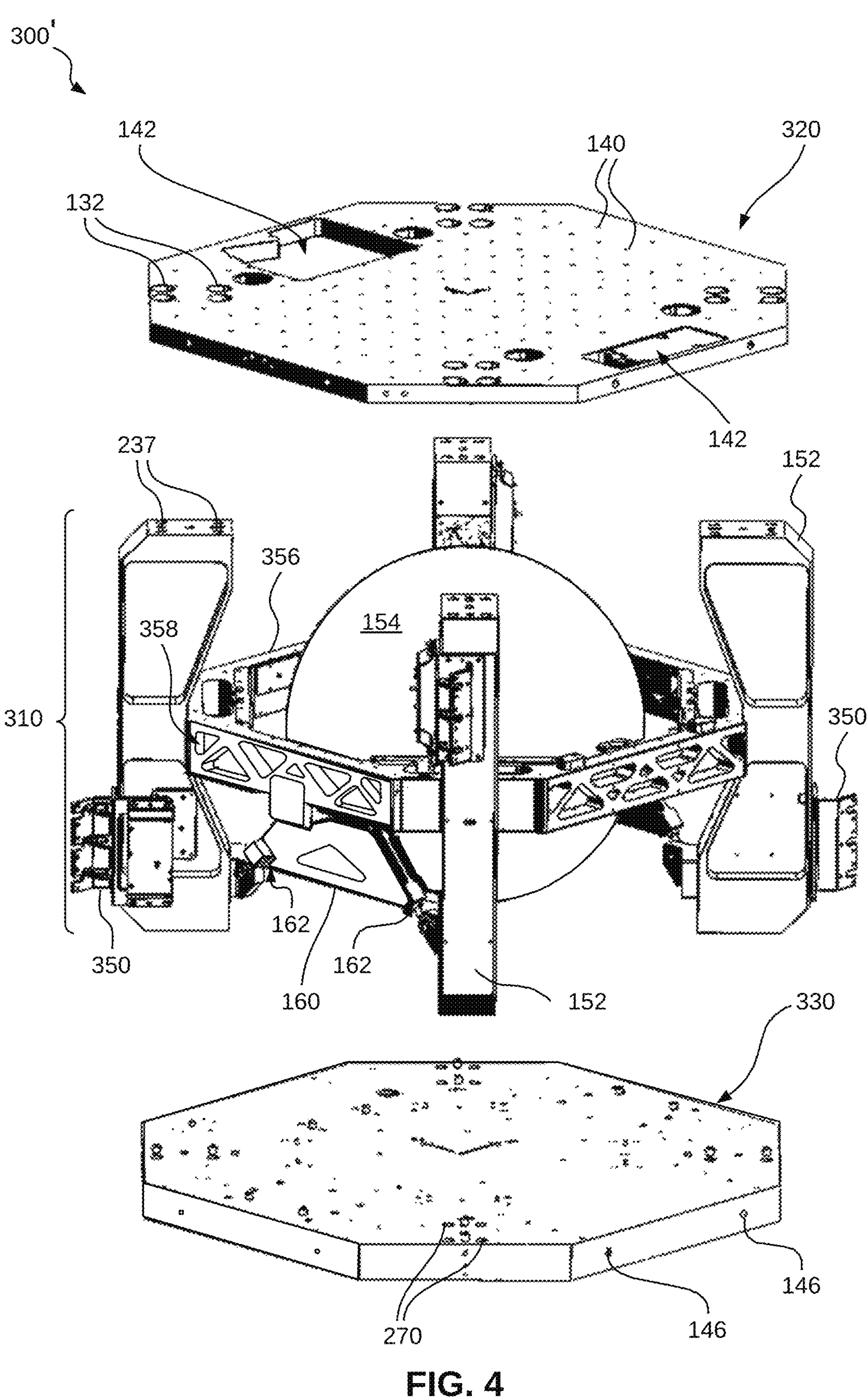
FIG. 4 illustrates an exploded view of the modular spacecraft system of FIG. 3, in accordance with an embodiment.

FIG. 4 illustrates an exploded view 300' of the modular spacecraft system of FIG. 3, in accordance with an embodiment. Similar to the embodiment illustrated in FIG. 2, the exploded view of modular spacecraft system 300 shows the various openings, bolt holes, and other features that enable separate assembly and testing of propulsion assembly 310, top plate assembly 320, and bottom plate assembly, each assembly with its own set of attached components and payloads. Then, once the necessary testing and certification of the separate assemblies have been completed, the assemblies may be bolted together to form the entirety of the modular spacecraft system. Further, if an issue arises with any component of the modular spacecraft, that particular component may be separately serviced and/or the assembly associated with that particular component may be separated from the modular spacecraft system, repaired, recertified, then re-attached without affecting other assemblies of the modular spacecraft system.

Figure 5A:
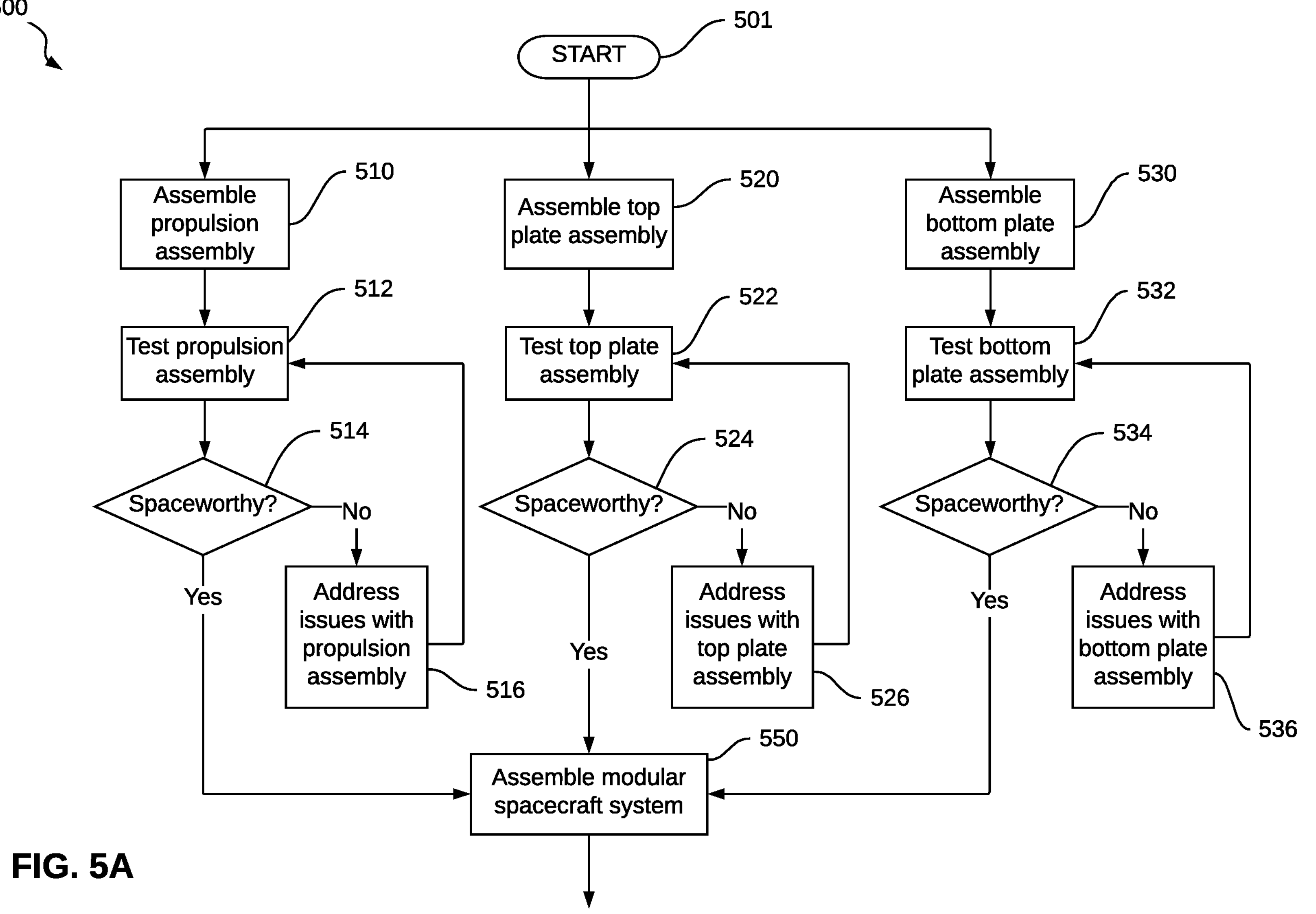
FIG. 5A shows a portion of a process for manufacturing a modular spacecraft system, in accordance with an embodiment.

FIG. 5 shows a portion of a process for manufacturing a modular spacecraft system, in accordance with an embodiment. As shown in FIG. 5, a process 500 begins with a start step 501, then proceeds to a step 510 to assemble a propulsion assembly (e.g., propulsion assembly 110 of FIG. 1 or propulsion assembly 310 of FIG. 3). The propulsion assembly so assembled is tested for spaceworthiness in a step 512 to make a determination in a decision 514 whether the propulsion assembly is indeed spaceworthy. If the determination from decision 514 is NO, then process 500 proceeds to a step 516 to address any issues with the propulsion assembly that make the assembly not spaceworthy. Then process 500 returns to step 512 to test the propulsion assembly again.

In parallel or sequentially, process 500 also includes a step 520 to assemble a top plate assembly (e.g., top plate assembly 120 of FIG. 1 or top plate assembly 320 of FIG. 3). The top plate assembly so assembled is tested for spaceworthiness in a step 522 to make a determination in a decision 524 whether the top plate assembly is indeed spaceworthy. If the determination from decision 524 is NO, then process 500 proceeds to a step 526 to address any issues with the top plate assembly and attempt to bring top plate assembly into compliance with spaceworthiness requirements. Then process 500 returns to step 522 to once again test the top plate assembly.

Similarly, in parallel or sequentially, process 500 includes a step 530 to assemble a bottom plate assembly (e.g., bottom plate assembly 130 of FIG. 1 or bottom plate assembly 330 of FIG. 3). The bottom plate assembly so assembled is tested for spaceworthiness in a step 532 to make a determination in a decision 534 whether the bottom plate assembly is indeed spaceworthy. If the determination from decision 534 is NO, then process 500 proceeds to a step 536 to address any issues with the bottom plate assembly that make the assembly not spaceworthy. Then process 500 returns to step 532 to test the bottom plate assembly again.

If the determinations from decisions 514, 524, and 534 are all YES, then process 500 proceeds to a step 550 to assemble the modular spacecraft system. Process 500 proceeds to additional steps illustrated in FIG. 5B.

Figure 5B:
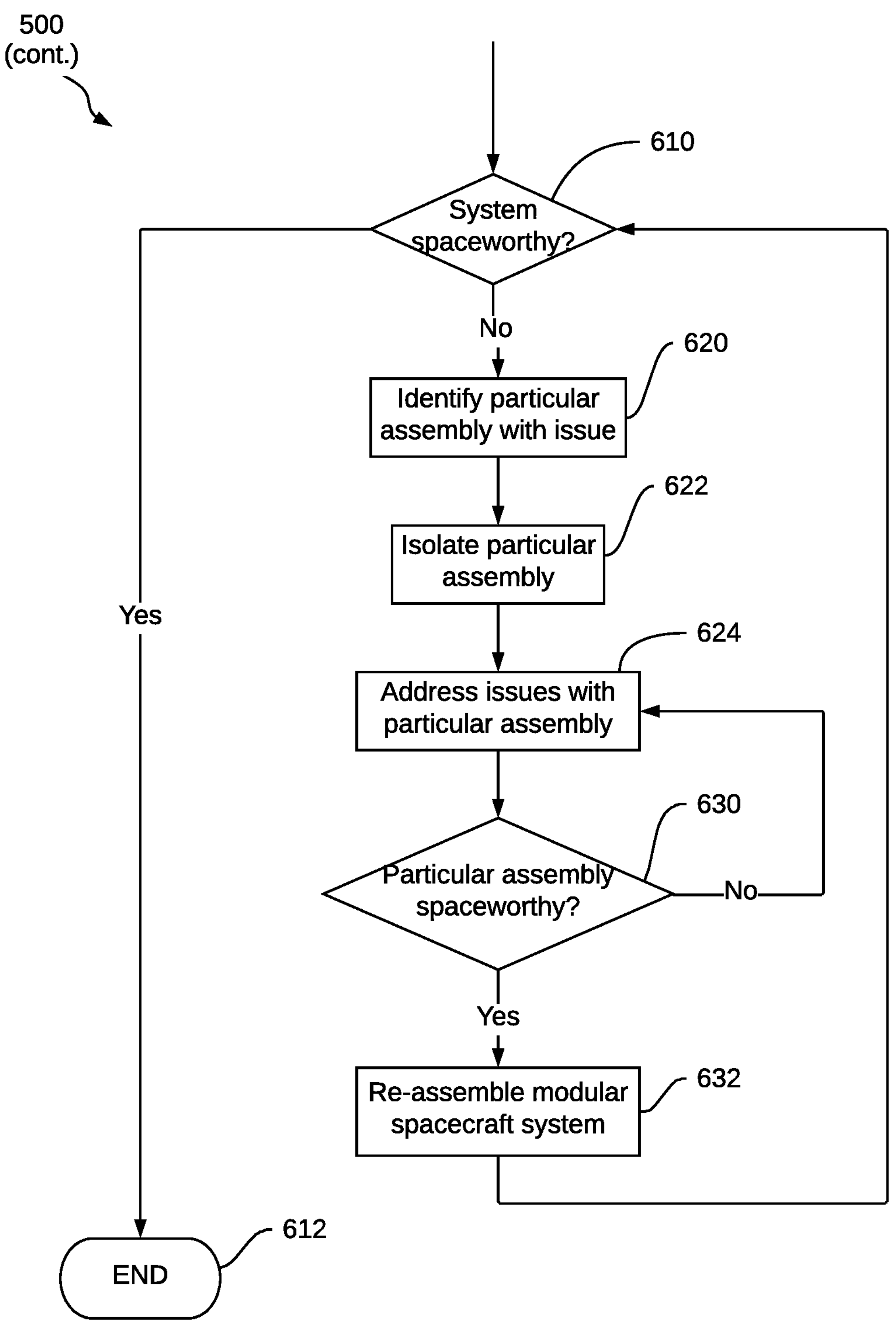
FIG. 5B shows continued steps of the process for manufacturing the modular spacecraft system, in accordance with an embodiment.

FIG. 5B shows continued steps of the process for manufacturing the modular spacecraft system, in accordance with an embodiment. Process 500 continues with a decision 610 to determine whether the modular spacecraft system, so assembled in step 550, is spaceworthy as an assembled system. If decision 610 determines the assembled modular spacecraft system is indeed spaceworthy, then process 500 is terminated in an end step 612.

If decision 610 determines the assembled modular spacecraft system is not spaceworthy, then one or more particular assemblies (e.g., one or more of the propulsion assembly, top plate assembly, and bottom plate assembly) with issues detracting from spaceworthiness is identified. The particular assembly so identified is isolated in a step 622. Isolation step 622 may include, for example, a partial disassembly of the assembled modular spacecraft system to disengage the particular assembly from the other assemblies without issues. In a step 624, any issues with the particular assembly are addressed, then the particular assembly is tested again in a decision 630. If there are continued issues with the particular assembly, process 500 returns to step 624 in a repeated attempt to address the identified issue.

Once determination is made in decision 630 that the particular assembly is now spaceworthy, then the modular spacecraft system is reassembled in a step 632, and process 500 returns to decision 610 to again determine whether the assembled modular spacecraft system is now spaceworthy. It is noted that, in process 500 of FIGS. 5 and 6, only the particular assembly identified as having issues is removed, repaired, and re-tested. That is, it is not necessary to disassemble the non-affected assemblies. This feature is particularly useful in manufacturing a system as complicated as a modular spacecraft system. For example, unlike existing spacecraft manufacturing techniques, it is much easier to swap out or repair portions of a given assembly (e.g., top plate assembly, propulsion assembly, and/or bottom plate assembly) using the process embodiments described herein.

A variety of modifications and variations to the above described embodiments may be contemplated, and such modifications and variations are considered to be a part of the present disclosure. Therefore, the descriptions contained herein are not intended to be limiting. Some contemplated modifications include, but are not limited to the following:

1. Whereas the spacecraft bus system illustrated in FIG. 1 is shown as having cube-like dimensions, the dimensions of the system may be modified to be more cuboid, rectangular, cylinder-like, pyramid-like, tetrahedron-like, polygonal, and other shapes in order to accommodate, for example, different types of propellant, enhancing stiffness of the structure, and/or allowing hosted payloads of varying shapes and sizes. The system may also be scaled to be compatible with larger or smaller payloads and propulsion systems.
2. Components of the different assemblies may include one or more cutouts and openings for enhancing the stiffness of those components, reducing the weight of those components, accommodating attachment of additional components and payloads of various shapes and sizes, and assisting with transportation and manipulation of those assemblies during the construction process.
3. While advantages of an all-aluminum modular spacecraft system is recognized herein, materials other than aluminum may be used for portions of the bus structure to reduce the weight of the overall system and/or providing enhanced stiffness.
4. Additional features, such as bosses, edge curvatures, feet, hooks, and interlocking mechanisms may be provided on the propulsion assembly, top plate assembly, or bottom plate assembly to enable stacking of the system on a launch vehicle.
5. One or more components of the assemblies in the spacecraft bus system may be formed, for example, by additive manufacturing methods with propulsion lines embedded into the structure of the various components. For instance, one or more components may be 3D aluminum or composite printed with propulsion lines embedded therein.
6. One or more components of the assemblies in the spacecraft bus system may be configured as a foldable structure. For example, the propulsion assembly may include a flexible propulsion wall and a containment/release mechanism to enable the propulsion wall to be folded or unfolded such that the propulsion structure may function as a high-pressure propulsion assembly in certain situations (e.g., on ground) and as a low-pressure propulsion assembly in other situations (e.g., in orbit). Such a flexible arrangement may allow the launch of many more vehicles for a given volume.
7. The propulsion assembly may be configured to support a variety of propulsion systems, including mono prop, bi prop, and electric propulsion.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

The invention claimed is:

1. A method for manufacturing a modular spacecraft system, the method comprising:

assembling a propulsion assembly, the propulsion assembly including a fuel tank, a plurality of legs, and a frame that connects the fuel tank and at least one of the legs, wherein the plurality of legs are exterior to the fuel tank for supporting the propulsion assembly, and each one of the plurality of legs includes a top end and a bottom end;

testing the propulsion assembly for spaceworthiness;

assembling a top plate assembly, the top plate assembly including a top plate, the top plate including a first set of bolt holes and a first set of openings, the first set of bolt holes for attachment of the top plate to top ends of the legs of the propulsion assembly, and the first set of openings for attachment of a top payload thereto;

independently testing the top plate assembly for spaceworthiness;

assembling a bottom plate assembly, the bottom plate assembly including a bottom plate, the bottom plate including a second set of bolt holes and a second set of openings, the second set of bolt holes for attachment of the bottom plate to bottom ends of the legs of the propulsion assembly, and the second set of openings for attachment of a bottom payload thereto;

independently testing the bottom plate assembly for spaceworthiness; and integrating the propulsion assembly, the top plate assembly, and the bottom plate assembly to form the modular spacecraft system, wherein integrating the propulsion assembly, the top plate assembly, and the bottom plate assembly includes:

affixing the top plate attached with the top payload to the top end of each one of the plurality of legs through the first set of bolt holes, wherein the top plate is the top of the fuel tank in an assembled modular spacecraft system, and affixing the bottom plate attached with the bottom payload to the bottom end of each one of the plurality of legs through the second set of bolt holes such that the top plate assembly and the bottom plate assembly are spaced apart from one another by the propulsion assembly disposed therebetween, wherein the bottom plate is the bottom of the fuel tank in the assembled modular spacecraft system.

2. The method of claim 1, further comprising testing the modular spacecraft system so manufactured for spaceworthiness.

3. The method of claim 2, further comprising, if an issue is found with one of the propulsion assembly, the top plate assembly, and the bottom plate assembly during the testing of the modular spacecraft system so formed:

identifying a particular one of the propulsion assembly, the top plate assembly, and the bottom plate assembly with the issue; isolating the particular one of the propulsion assembly, the top plate assembly, and the bottom plate assembly with the issue from other ones of the propulsion assembly, the top plate assembly, and the bottom plate assembly; addressing the issue with the particular one of the propulsion assembly, the top plate assembly, and the bottom plate assembly; re-testing the particular one of the propulsion assembly, the top plate assembly, and the bottom plate assembly for spaceworthiness; and re-integrating the propulsion assembly, the top plate assembly, and the bottom plate assembly to re-form the modular spacecraft system, without re-testing of all of the propulsion assembly, the top plate assembly, and the bottom plate assembly other than the particular one of the propulsion assembly, the top plate assembly, and the bottom plate assembly to form the modular spacecraft system.

4. The method of claim 1, wherein the propulsion system includes a plurality of thrusters, and wherein assembling the propulsion assembly further includes providing a plurality of brackets mounted onto the plurality of legs, and attaching at least one of the plurality of thrusters to one of the plurality of brackets.

5. The method of claim 1, further comprising, prior to assembling the propulsion assembly, the top plate assembly, and the bottom plate assembly, forming the top plate, the bottom plate, the frame, and the plurality of legs out of materials with similar values of coefficient of thermal expansion.

6. The method of claim 5, wherein forming the top plate, the bottom plate, the frame, and the plurality of legs includes fabricating the top plate, the bottom plate, the frame, and the plurality of legs out of like material.

7. The method of claim 5, wherein forming the top plate, the bottom plate, the frame, and the plurality of legs includes fabricating the top plate, the bottom plate, the frame, and the plurality of legs out of a metal.

8. The method of claim 1, further comprising, providing a plurality of openings in the frame, the plurality of openings being configured for providing structural integrity to support the propulsion system while exhibiting reduced weight compared to an unmodified frame without the plurality of openings provided therein.

* * * * *